United States Patent [19]
Itano et al.

[11] Patent Number: 5,980,753
[45] Date of Patent: Nov. 9, 1999

[54] PROCESS FOR RECOVERING VOLATILE ACIDS

[75] Inventors: Mitsushi Itano; Tatsuya Unemoto, both of Settsu, Japan

[73] Assignee: Daikin Industries, Ltd., Osaka, Japan

[21] Appl. No.: 08/558,897

[22] Filed: Nov. 16, 1995

Related U.S. Application Data

[63] Continuation of application No. 08/137,161, filed as application No. PCT/JP93/00295, Mar. 10, 1993.

[30] Foreign Application Priority Data

Mar. 13, 1992 [JP] Japan ........................................ 4-89799

[51] Int. Cl.$^6$ .................................................... B01D 15/04
[52] U.S. Cl. ........................... 210/670; 210/676; 210/683; 423/394.2; 423/488
[58] Field of Search ..................................... 210/670, 676, 210/683; 423/394.2, 484, 488, 531

[56] References Cited

U.S. PATENT DOCUMENTS

| | | | |
|---|---|---|---|
| 4,056,605 | 11/1977 | Vulikh et al. | 423/488 |
| 4,202,737 | 5/1980 | Shimizu | 210/676 |
| 4,717,554 | 1/1988 | Nomura et al. | 210/683 |
| 4,734,200 | 3/1988 | Berry | 210/683 |
| 4,882,134 | 11/1989 | Mizrahi | 423/484 |

*Primary Examiner*—Ivars Cintins
*Attorney, Agent, or Firm*—Nikaido Marmelstein Murray & Oram LLP

[57] ABSTRACT

The present invention provides a process for recovering a volatile acid charaterized by bringing a waste liquid containing the volatile acid into contact with an amine having a boiling point of at least 50° C. to thereby cause the amine to tonically adsorb the acid from the waste liquid, and thereafter heating the amine to desorb the acid, and a process for treating waste water utilizing this process.

19 Claims, No Drawings

PROCESS FOR RECOVERING VOLATILE ACIDS

This is a continuation of application Ser. No. 08/137,161 filed Oct. 27, 1993, now abandoned, which is a 371 of PCT/JP93/00295 filed Mar. 10, 1993.

TECHNICAL FIELD

The present invention relates to a process for recovering volatile acids and to a process for treating waste water utilizing this process.

BACKGROUND ART

For example, hydrofluoric acid is recovered from waste liquids containing this acid conventionally by (1) a process wherein fluoride ions are reacted with a calcium, magnesium or like compound to precipitate the ions as a fluoride (JP-A-89984/1983, JP-B-71197/1991, etc.), or (2) a process wherein fluoride ions in the waste liquid are captured by a device having an ion exchange membrane and an ion exchange resin in combination and electrically dialyzed in an electric field to recover hydrofluoric acid (JP-A-123606/1989, JP-A-130782/1989, etc.). However, the process (1) requires decomposition of the fluoride with an acid such as sulfuric acid when hydrofluoric acid is reproduced, necessitating a great apparatus for the filtration of the precipitate and the subsequent decomposition. The process (2) requires a large quantity of electric power, further necessitating the step of separating the recovered acid from other acid, for example, by evaporation or forming the fluoride of calcium, magnesium or the like.

Thus, the prior art has the problems of requiring an additional chemical for recovering hydrofluoric acid and a further treatment of the recovered substance foe separation, and consuming a large amount of electric power.

An object of the present invention is to obviate these problems and to provide a process for recovering volatile acids without necessitating additional chemicals and much electric power and without necessitating a separation or decomposition treatment after recovery.

Another object of the invention is to provide a process for treating waste water utilizing the above process.

The present invention provides a process for recovering a volatile acid charaterized by bringing a waste liquid containing the volatile acid into contact with an amine having a boiling point of at least 50° C. to thereby cause the amine to ionically adsorb the acid from the waste liquid, and thereafter heating the amine to desorb the acid.

The present invention also provides a waste water treating process characterized in that a waste liquid containing a volatile acid is brought into contact with an amine having a boiling point of at least 50° C. to thereby cause the amine to ionically adsorb the acid from the waste liquid.

The waste liquids containing a volatile acid and to be treated according to the invention include, for example, those containing an acid such as hydrofluoric acid, hydrochloric acid or nitric acid. These waste liquids may further contain sulfuric acid or like nonvolatile component, ammonium fluoride or the like. Such nonvolatile components, even if present, will not affect the volatile acid recovering treatment of the invention but reduce the adsorbing capacity of the amine, so that presence of nonvolatiles in a large quantity is not desirable.

Examples of useful amines having a boiling point of at least 50° C. are anion exchange resins, polyamines, aliphatic amines, aromatic amines and nitrogen-containing heterocyclic compounds. When having a boiling point of below 50° C., amines themselves will evaporate when heated, and such amines are therefore undesirable. Examples of anion exchange resins are those comprising a copolymer of styrene and divinylbenzene, polyolefin polymer or the like as the base material. Examples of polyamines are 1,8-diaminooctane, 1,1,4,7,10,10-hexamethyltriethylenetetramine, N,N'-bis(3-aminopropyl)-1,3-propanediamine, etc. Examples of aliphatic amines are hexacyclen, hexamethylhexacyclen, etc. Examples of aromatic amines are 2,3-diaminonaphthalene, 9,10-diaminophenanthrene, etc. Examples of nitrogen-containing heterocyclic compounds are 4,7-phenanthroline, carbazole, 29H, 31H-phthalocyanine, etc.

According to the invention, the volatile acid is brought into contact with the amine, for example, by passing the waste liquid of volatile acid through a column packed with the amine, or by contacting the waste liquid with the amine batchwise without using a column. The contact thus effected causes the amine to ionically adsorb the volatile acid. With the latter batchwise process, it is necessary to separate the amine from the waste liquid after adsorption and before the subsequent step of heating, whereas the amine need not be so separated off with the former column process.

The adsorbed volatile acid is released from the amine by heating. The amine is heated by a desired method. For example, it is heated as contained in the column or with hot air passed through the column. It is desired that the heating temperature be such that the amine remains unaffected by heat to the greatest possible extent, that is, not higher than the limit within which the amine retains its function. The amine is heated until the component released therefrom becomes neutral in pH value. The preferred heating time is usually in the range of 1 minute to 50 hours.

With the process of the invention, the heating temperature is usually about 50 to about 180° C., preferably about 70 to about 130° C.

The present process is usable for treating waste water to remove volatile acids therefrom even if the concentration of the acid is low and can not be recovered efficiently. More specifically, the waste water treating process is conducted, for example, by a system comprising two columns arranged in parallel, packed with an amine and each connected to waste water, acid recovery and steam lines. The two columns are operated alternately. While one of the columns is treating waste water, the other column is used for recovering (regenerating) the acid in preparation for the subsequent treatment. When saturated with the adsorbed acid by passing waste water, the column is changed over to the other column. The saturated column is heated as by passing steam therethrough to recover the acid. Waste water can be treated continuously by repeating the above procedure.

BEST MODE FOR CARRYING OUT THE INVETNION

The present invention will be described in detail with reference to the following examples.

EXAMPLE 1

Hydrofluoric acid was recovered by the following process using the anion exchange resin stated below as an amine. Table 1 shows the result.

Anion Exchange Resin

Base material: styrene-divinylbenzene copolymer

Exchange group: —$CH_2N(CH_3)_2$
Exchange capacity: at least 1.5 meq/ml
Apparent density: 615 g/l
Effective particle size: 0.4~0.6 mm (1) A 4.1 g quantity of the anion exchange resin was placed into 20 g of 2% aqueous hydrofluoric acid solution (0.02 mole). The mixture was stirred, and filtered about 5 minutes later. The filtrate was checked for HF concentration. The difference between the amount of HF used and the amount of HF in the filtrate was taken as the amount of HF adsorbed.

(2) The anion exchange resin was washed with water and thereafter placed into a platinum dish, which was then heated on a hot plate at 100° C. for 2 hours.

(3) After heating, 10 g of 2.27N aqueous NaOH solution was added to the anion exchange resin, followed by stirring and, about 5 minutes later, by filtration. The filtrate was titrated with 2.5N hydrochloric acid to determine the amount of remaining HF. The difference between the amount of adsorption and the remaining amount was taken as the amount of HF released.

(4) After washing the resin with water, the step (1) was repeated again to determine the amount of adsorption.

(5) The above procedure was repeated to check the resin for variations in the amount of HF thereby adsorbed and for durability.

TABLE 1

Variations in the Amount of Adsorbed HF after Heat Treatment

| Repetition | Adsorbed HF measurement (mole) | Relative ratio (%) |
| --- | --- | --- |
| Initial | $1.62 \times 10^{-2}$ | 100 |
| First | $1.44 \times 10^{-2}$ | 89 |
| Second | $1.39 \times 10^{-2}$ | 86 |
| Third | $1.36 \times 10^{-2}$ | 84 |

Note: The relative ratio was based on the initial adsorption measurement which was taken as 100. The amount of HF released was at least 90% of the amount of adsorption each time.

EXAMPLE 2

Hydrofluoric acid was recovered by the same process as in Example 1 using the polyamine beads described below. Table 2 shows the result.
Polyamine Beads
  Base material: straight-chain olefin polymer (crosslinked beads)
  Exchange group: —$CH_2NH_2$
  Exchange capacity: 15 meq/g (dry)
  Size of beads: 48~145 mesh This experiment was conducted in the same manner as in Example 1 with the exception of using the polyamine beads which corresponded to 0.01 mole in exchange capacity and heating the beads at about 85° C.

TABLE 2

Variations in the Amount of Adsorbed HF after Heat Treatment

| Repetition | Adsorbed HF measurement (mole) | Relative ratio (%) |
| --- | --- | --- |
| Initial | $9.84 \times 10^{-3}$ | 100 |
| First | $8.62 \times 10^{-3}$ | 88 |
| Second | $7.20 \times 10^{-3}$ | 73 |
| Third | $6.33 \times 10^{-3}$ | 64 |

Note: The relative ratio was based on the initial adsorption measurement which was taken as 100. The amount of hydrofluoric acid released was at least 70% of the amount of adsorption each time.

EXAMPLE 3

Hydrochloric acid was recovered using the same anion exchange resin as in Example 1. Table 3 shows the result. This experiment was carried out in the same manner as in Example 1 with the exception of using 20 g of hydrochloric acid having a concentration of 3.6% (0.02 mole) and 3.6 g of the anion exchange resin and heating the resin at 100° C.

TABLE 3

Variations in the Amount of Adsorbed HCl after Heat Treatment

| Repetition | Adsorbed HCl measurement (mole) | Relative ratio (%) |
| --- | --- | --- |
| Initial | $8.92 \times 10^{-3}$ | 100 |
| First | $4.15 \times 10^{-3}$ | 47 |
| Second | $4.04 \times 10^{-3}$ | 45 |
| Third | $3.07 \times 10^{-3}$ | 34 |

Note: The relative ratio was based on the initial adsorption measurement which was taken as 100. The amount of HCl released was at least 90% of the amount of adsorption each time.

Industrial Applicability

According to the invention, volatile acids are adsorbed by an amine, which is then heated for the recovery of the acid, so that volatile acids can be recovered by an inexpensive simple apparatus. As compared with conventional processes, e.g., the recovery process wherein a fluoride is formed, the invention can be practiced by a compacted apparatus without using an acid for decomposition. Further unlike the electric dialysis process, a particular volatile acid only can be recovered selectively. The volatile acid can therefore be recovered with a high purity and at a high concentration (almost about 100%).

We claim:

1. A process for recovering a volatile acid which comprises:
  bringing a liquid containing the volatile acid into contact with an amine, selected from the group consisting of an anion exchange resin and a polyamine, having a boiling point of at least 50° C. under conditions sufficient to thereby cause the amine to ionically adsorb the volatile acid from the liquid,
  thereafter heating the amine. having said volatile acid adsorbed thereon, to a temperature and for a time sufficient to desorb substantially pure volatile acid from said amine, and
  recovering said substantially pure, desorbed volatile acid.

2. A process as defined in claim 1 wherein the volatile acid is hydrofluoric acid.

3. The process as claimed in claim 1 including the further step of separating said amine, having the volatile acid adsorbed therein, from said liquid; and then heating said amine to spring the volatile acid therefrom.

4. The process as claimed in claim 1 further including, after said amine has been heated to the remove the volatile acid therefrom and to thereby regenerate said amine, contacting said regenerated amine with additional liquid containing volatile acid.

5. The process as claimed in claim 1 wherein said amine is a solid during said volatile acid adsorption contacting of said liquid therewith.

6. The process as claimed in claim 1 wherein said heating to desorb said volatile acid from said amine is carried out at a temperature of about 70 to 130° C.

7. The process as claimed in claim 1 carried out in a cycling mode by further providing at least two separate zones containing said amine; feeding said liquid to less than all of said zones at a time; and heating at least one zone containing amine with adsorbed acid to spring the volatile acid therefrom while adsorbing the volatile acid from said liquid in at least one other, separate zone.

8. The process as claimed in claim 1 wherein said volatile acid is hydrogen fluoride dissolved in said liquid.

9. The process as claimed in claim 1 including recovering up to about 100% of said volatile acid adsorbed by said amine.

10. The process as claimed in claim 1 wherein said volatile acid is at least one member selected from the group consisting of nitric, hydrochloric and hydrofluoric acids.

11. A waste water treating process comprising:

contacting a waste aqueous liquid containing a volatile acid with an amine, selected form the group consisting of an anion exchange resin and a polyamine, having a boiling point of at least 50° C. for a time sufficient to thereby cause the amine to ionically adsorb the volatile acid from the waste liquid;

recovering aqueous liquid having a reduced content of said volatile acid;

heating said amine under conditions sufficient to desorb substantially pure volatile acid from said amine; and recovering said substantially pure, desorbed volatile acid.

12. The process as claimed in claim 11 including the further step of separating said amine, having the volatile acid adsorbed therein, from said aqueous liquid; and then heating said amine to spring the volatile acid therefrom.

13. The process as claimed in claim 11 further including heating said amine to remove the volatile acid therefrom to an extent sufficient to regenerate said amine, and after said amine has been heated to remove the volatile acid therefrom and to thereby regenerate said amine, contacting said regenerated amine with additional aqueous liquid containing volatile acid.

14. The process as claimed in claim 11 wherein said amine is a solid during said volatile acid adsorption contacting of said aqueous liquid therewith.

15. The process as claimed in claim 11 wherein said heating to desorb said volatile acid from said amine is carried out at a temperature of about 70 to 130° C.

16. The process as claimed in claim 11 carried out in a cycling mode by further providing at least two separate zones containing said amine; feeding said aqueous liquid to less than all of said zones at a time; and heating one zone containing amine with adsorbed volatile acid to spring the volatile acid therefrom while adsorbing volatile acid from said aqueous liquid in at least one other, separate zone.

17. The process as claimed in claim 11 wherein said volatile acid is hydrogen fluoride dissolved in said aqueous liquid.

18. The process as claimed in claim 11 including recovering up to about 100% of said volatile acid adsorbed by said amine.

19. The process as claimed in claim 11 wherein said volatile acid is at least one member selected from the group consisting of nitric, hydrochloric and hydrofluoric acids.

* * * * *